United States Patent [19]
Masutani

[11] Patent Number: 5,847,809
[45] Date of Patent: Dec. 8, 1998

[54] PHOTOGRAPHIC PROCESSING APPARATUS

[75] Inventor: Hironori Masutani, Wakayama, Japan

[73] Assignee: Noritsu Koki Co., Ltd, Wakayama-ken, Japan

[21] Appl. No.: 925,304

[22] Filed: Sep. 8, 1997

[30] Foreign Application Priority Data

Sep. 10, 1996 [JP] Japan .................................. 8-238821
Sep. 13, 1996 [JP] Japan .................................. 8-243061
Sep. 13, 1996 [JP] Japan .................................. 8-243062

[51] Int. Cl.⁶ .................................................. G03B 27/52
[52] U.S. Cl. ................................ 355/27; 355/77; 355/40
[58] Field of Search ................................ 355/40, 41, 77, 355/27–29; 235/375, 462

[56] References Cited

U.S. PATENT DOCUMENTS 4,574,692  3/1986  Wahlil ...................................... 355/40
5,159,385  10/1992  Imamura ................................ 355/40

FOREIGN PATENT DOCUMENTS 0136980  4/1985  European Pat. Off. ....... G03D 15/00
0255480  2/1988  European Pat. Off. ....... G06K 17/00
0475278  9/1991  European Pat. Off. ....... G03B 27/73
643622  2/1994  Japan .

*Primary Examiner*—D. Rutledge
*Attorney, Agent, or Firm*—Fulbright & Jaworski, LLP.

[57] ABSTRACT

A trouble identifying device $5h$ identifies a process disrupting trouble occurring during a process of printing images of negative films 2 on printing paper 3. When a process disrupting trouble occurs, error information on the process disrupting trouble identified by the trouble identifying device is linked to an ID code of a corresponding negative film. The error information is printed by printer 26 in the region of the printing paper for printing the image of the negative film having caused the process disrupting trouble. When the process disrupting trouble occurs, an error indicating image showing occurrence of the process disrupting trouble is formed in the region of the printing paper for printing the image of the negative film having caused the process disrupting trouble. The error indicating image on the printing paper is cut to a predetermined length, and discharged from a print outlet 50 as an error indicating print $3a$.

10 Claims, 8 Drawing Sheets

C.U.=CONTROL UNIT     D.U.= DETERMINING UNIT
I.U. = IDENTIFYING UNIT     L.U.= LINK UNIT

PHOTOGRAPHIC PROCESSING APPARATUS

BACKGROUND OF THE INVENTION

1. Field of the Invention

This invention relates to a photographic processing apparatus having an exposing section for printing images of negative films on printing paper, a negative film outlet for discharging the negative films used in the exposing section, a developing section for developing the printing paper printed, and a print outlet for cutting the printing paper developed to predetermined lengths, and discharging the cut printing paper as prints, the negative films being discharged unit by unit from the negative film outlet and the prints having the images of the negative films in corresponding units being discharged unit by unit from the print outlet, the negative films and prints being combined and collated as finished products.

2. Description of the Related Art

In the photographic processing apparatus noted above, a combination of negative films and prints processed as one unit usually is based on a single length of negative film or one set of piece negatives (cut negative films each having four or six frames) ordered by a customer. This one unit is called one order also. A photographic processing apparatus for collating piece negatives (one long negative film ultimately being cut to piece negatives of a predetermined length) and prints in one order or unit and automatically putting the negatives and prints in a product packet is known from Japanese Patent Publication Kokai No. H6-43622, for example. This photographic processing apparatus includes a stage of collating piece negatives and prints, in which the piece negatives in one unit inserted into negative sheets after an exposing process are put into a print packet printed with an ID number of these piece negatives. The ID number on the print packet is checked against ID numbers of prints transported unit by unit by a sorter. The prints in one unit having the same ID number are put into this print packet to be combined with the piece negatives having this ID number. Further, checking is made whether the number of prints is correct, and the prints are put into the product packet complete the collating operation.

With this collating system, the images of the negative film may not be printed at all on the printing paper due to a trouble occurring during photographic processing. Then, naturally, the piece negatives and prints transported successively have ID disagreeing when the negative film and prints are combined. It is necessary to check one ID number after another of the piece negatives and prints, to determine images of piece negatives not printed and therefore having no corresponding prints made. Further, if piece negatives are forcibly removed before discharge through the negative film outlet, there will be no piece negatives or prints to be collated, leaving only a product packet ready to receive these piece negatives and prints. The piece negatives and prints preceding and succeeding these will have to be checked to carry out a recovery operation. Where part of the images of the negative film are not printed on the printing paper due to a trouble occurring during photographic processing, the piece negatives and prints combined as finished products, on the face of it, have ID numbers in agreement. The collating disagreement is confirmed only when all the images on the piece negatives and on the prints are checked one after another, requiring a troublesome and time-consuming collating operation.

SUMMARY OF THE INVENTION

The object of this invention is to provide a photographic processing apparatus which enables the nature of a trouble to be determined easily during an operation to collate negative films and prints when the trouble occurs during photographic processing, resulting in all or part of images of negative films failing to be printed on printing paper, or the negative films being removed during transport.

The above object is fulfilled, according to one aspect of this invention, by a photographic processing apparatus as set forth, comprising trouble identifying means for identifying a process disrupting trouble occurring during a process of printing images of a negative film on the printing paper, error information on the process disrupting trouble identified by the trouble identifying means being linked to an ID code of the negative film having caused the process disrupting trouble, the error information being written in a region of the printing paper for printing an image of the negative film responsible for the process disrupting trouble.

In the above construction, the trouble identifying means identifies a process disrupting trouble, such as total blanking or total fogging of a negative film, or transport jamming of the negative film. Error information on the trouble identified at that point of time is linked to the ID code of the negative film having caused the trouble. The error information is written in the region of the printing paper for printing the image of the negative film responsible for the trouble. The portion of the printing paper having the error information written is discharged from the print outlet as a print. This notifies the operator engaged in a collating operation that there is a negative film having the particular trouble and what type of recovery operation the trouble requires. Thus, a recovery operation may be carried out only for the negative film having caused the trouble. That is, the prints having the error information written thereon is combined with the negative film having caused the trouble, so that this trouble does not affect other finished products processed in a normal way.

In a preferred embodiment of this invention, an unexposed region is formed in the region of the printing paper for printing an image of the negative film responsible for the process disrupting trouble, the error information being written on a back of the unexposed region. Then, the unexposed region discharged from the print outlet is white and clearly distinct from other prints. The operator can readily recognize the white print with the error information written thereon.

For convenience of the operator in checking what type of recovery operation should be carried out for the negative film having caused the trouble, it is proposed to write the error information in forms distinguishing between a trouble due to a mechanical factor and a trouble due to a human factor. For example, a four-digit number is used for a trouble due to a mechanical factor, such as transport jamming. The English alphabet may be used for a trouble due to a human factor, such as total blanking or total fogging.

To facilitate a collation of negative films and prints, it has been conventional to apply a print ID code linked to an ID code of a negative film in one unit, to the prints with images obtained from this negative film. In an embodiment of this invention, a print ID code linked to an ID code of the negative film having caused the process disrupting trouble is applied also to the print having the error information written thereon. Even when a normal print cannot be obtained because of a process disrupting trouble, the print with the error information written thereon and having the print ID code linked to the ID code of the negative film is discharged from the print outlet. Thus, a collating operation may be carried out by using the negative film ID code and print ID code as a key. The negative film ID code and print ID code are in a one to one relationship to realize a reliable combination of negative film and prints (including the print with the error information). The ID code of the negative film may also be written as error information to facilitate identification of a correspondence negative film from the print with the error information. Further, in this embodiment, a packet ID code linked to the ID codes of the negative film and prints may be allocated to a product packet for receiving finished products in one unit. Then, a negative film having caused a process disrupting trouble may be combined and checked based on the ID codes of the product packet, negative film and prints.

In view of conditions of space and the like, it is desirable that a printer is disposed on a printing paper transport path extending from the exposing section to the developing section, for printing error information on the printing paper. Considering that the printing paper with the error information written thereon is passed through developing solutions in the developing section, use of a dot print is recommended which provides prints highly resistive to the developing solutions.

The above-mentioned object is fulfilled, according to a second aspect of this invention, by a photographic processing apparatus as set forth in the outset hereof, comprising trouble identifying means for identifying a process disrupting trouble occurring during a process of printing images of a negative film on the printing paper, wherein an error indicating image showing occurrence of the process disrupting trouble is formed in a region of the printing paper for printing an image of the negative film responsible for the process disrupting trouble, the error indicating image on the printing paper being cut to a predetermined length and discharged from the print outlet as an error indicating print.

In the above construction, whenever a process disrupting trouble occurs to make printing of images of a negative film on the printing paper impossible, an error indicating image is formed on the printing paper and discharged as a print. Thus, the negative film and prints may be combined for collation. Since negative films and printing paper are processed continuously, finished products are successively made unit by unit by combining the negative films and prints unit by unit. If an error indicating print enters the combination, it means that the images of the negative film in this combination are not completely exposed. Thus, a recovery operation may be carried out only for this combination. If the combination includes no error indicating print, it may be confirmed that the images of the negative film are all printed on the printing paper and outputted as prints. That is, the negative films may be combined with the prints unit by unit whether a process disrupting trouble has occurred or not. A combination affected by a process disrupting trouble may easily be confirmed based on an error indicating print, to simplify the collating operation.

In a preferred embodiment of this invention, the error indicating image is an unexposed image. The error indicating print is developed, cut to a predetermined length, and discharged from the print outlet as a print having a white image plane. This error indicating print is clearly distinguishable from normal prints. A so-called unexposed print may be produced by the photographic processing apparatus most easily. Thus, a less burden is imposed on the apparatus than the case of forming a special error indicating print.

In a preferred embodiment of this invention, the photographic processing apparatus further comprises a tray conveyer mechanism including a plurality of trays each having a film holder for receiving the negative films in one unit discharged from the negative film outlet, and a print holder for receiving the prints discharged from the print outlet, the prints having images derived from said negative films being loaded into said film holder. In this case, the error indicating print is placed on the print holder of the tray loaded with the negative film having caused the process disrupting trouble. According to this construction, the negative films and prints to be combined are successively loaded into the trays, and the error indicating print is loaded on the tray loaded with the negative film having caused the process disrupting trouble. Thus, the tray having a collating disagreement may be confirmed easily though the collating operation is carried out continuously tray by tray.

When a process disrupting trouble occurs before starting an exposing process for the negative films in one unit, an exposing process may be carried out for next negative films in one unit after only the error indicating image is formed on the printing paper. Then, only the error indicating print is placed on the print holder of the tray loaded with the negative film having caused the process disrupting trouble. The negative film not printed at all may be identified with ease. When a process disrupting trouble occurs during an exposing process for the negative films in one unit, an exposing process may be carried out for next negative films in one unit after only the error indicating image is formed on the printing paper. Then, the error indicating print is placed on top of prints on the print holder of the tray loaded with the negative film having caused the process disrupting trouble. Since the error indicating print is placed on top of prints loaded on the print holder, a collating disagreement may easily be confirmed when a desired number of prints are not obtained from the negative films in one unit. In these two embodiments, the operator may notice a defective result of exposure only by observing the print holder of each tray.

Other features and the advantages of this invention will be apparent from the following description of the embodiments to be taken with reference to the drawing.

DESCRIPTION OF THE PREFERRED EMBODIMENTS

Figure 1:
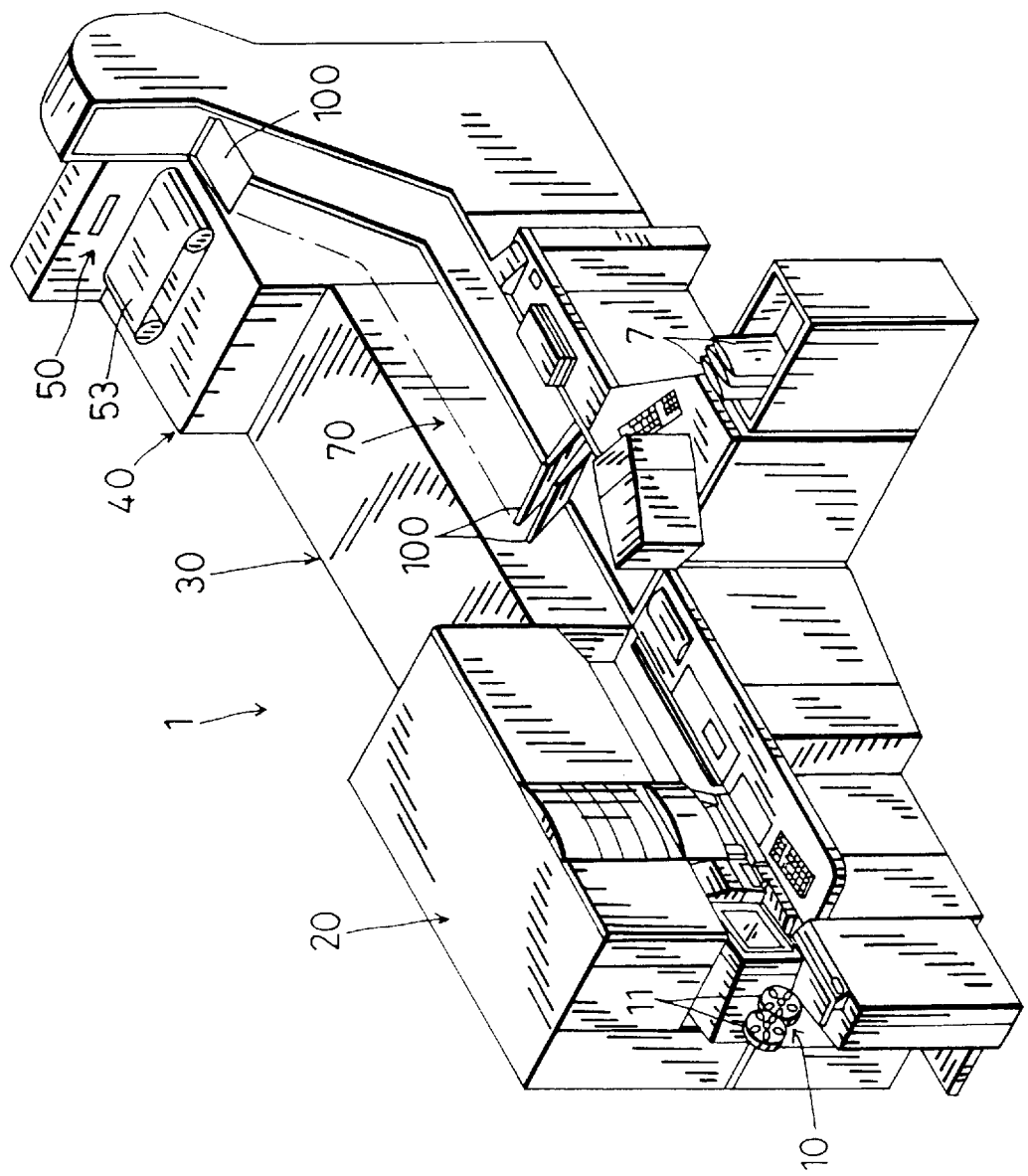
FIG. 1 is a perspective view of a photographic processing apparatus employing a photograph collating system according to this invention.
Figure 2:
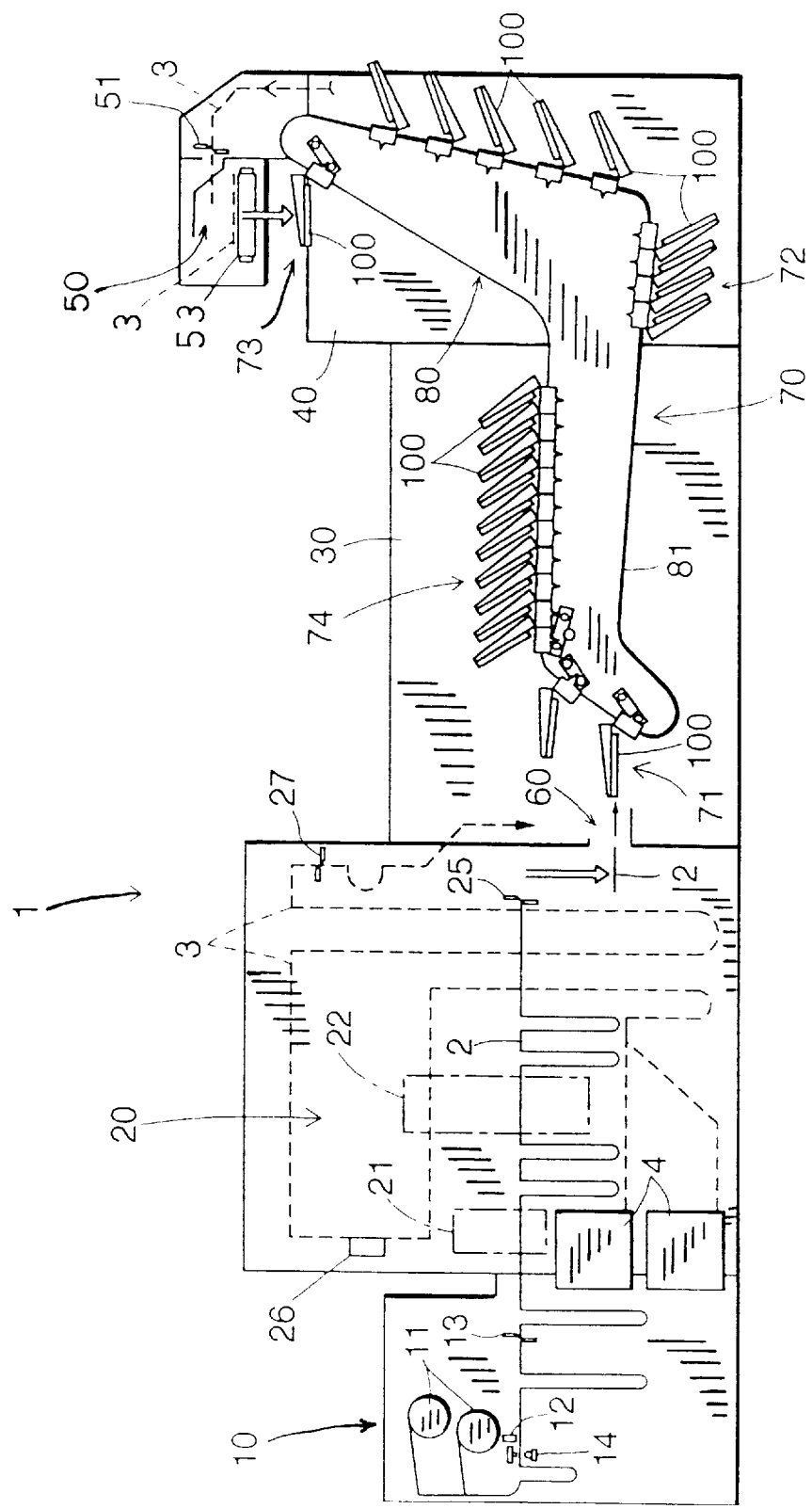
FIG. 2 is a schematic view of the photographic processing apparatus showing flows of negative films and printing paper in the apparatus of FIG. 1.

FIG. 1 shows an entire photographic processing apparatus 1 according to this invention. FIG. 2 schematically shows transport paths of a negative film 2 (the term negative film being used herein to refer collectively to a negative film having a length of one photographic film, cut piece negatives each having several frames, and a negative film in a cartridge designed for an advanced photo system) and printing paper 3 undergoing varied processes in the photographic processing apparatus 1. This photographic processing apparatus 1 includes a negative film feeder 10, an exposing section 20 for printing images of the negative film 2 on the printing paper 3 drawn from a paper magazine 4, a developing section 30 for developing the exposed printing paper 3, a drying section 40 for drying the developed printing paper 3, a print outlet 50 for cutting and discharging the dried printing paper 3 in predetermined lengths as prints, a negative film outlet 60 for cutting and discharging the negative film 2 used in the exposing section 20, with negative sheets inserted as necessary, and a conveyer mechanism 70 for collating and combining, as a finished product, the cut negative films 2 in one unit (which may be regarded as one order to facilitate understanding) received from the negative film outlet 60 and the prints in the one unit received from the print outlet 50, and transporting the finished product to a position for collection by the operator.

The negative film feeder 10 may be loaded with two negative reels 11 each having up to 100 negative films 2 connected by splicing tape. A bar-code reader 12 reads bar codes on the negative films 2 drawn from either negative reel 11. A negative cutter 13 cuts the negative films 2 order by order. An image sensor 14 checks frame images on the negative films 2.

Figure 3:
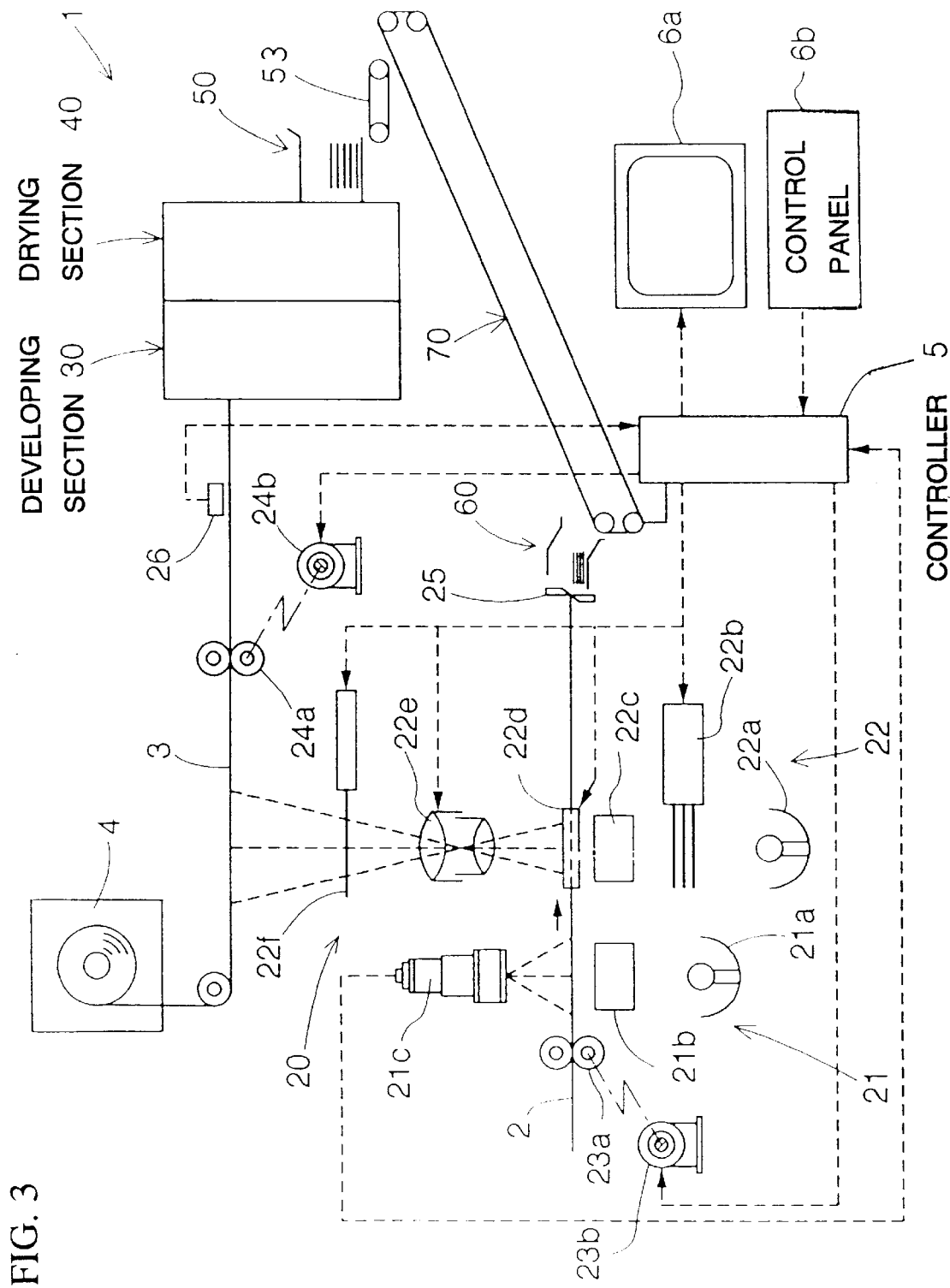
FIG. 3 is a block diagram of the photographic processing apparatus shown in FIG. 1.

As shown in FIG. 3, the exposing section 20 includes a film reader 21 disposed upstream with respect to a direction of film transport and having a reading light source 21a, a mirror tunnel 21b and an image pickup 21c, and an exposing device 22 disposed downstream with respect to the film transport direction and having an exposing light source 22a, a light adjustment filter 22b, a mirror tunnel 22c, a negative mask 22d, a printing lens 22e and a shutter 22f. Rollers 23a and a motor 23b for driving the rollers 23a are provided to transport the negative film 2 from the negative film feeder 10 through the exposing section 20 to the negative outlet 60.

Figure 4:
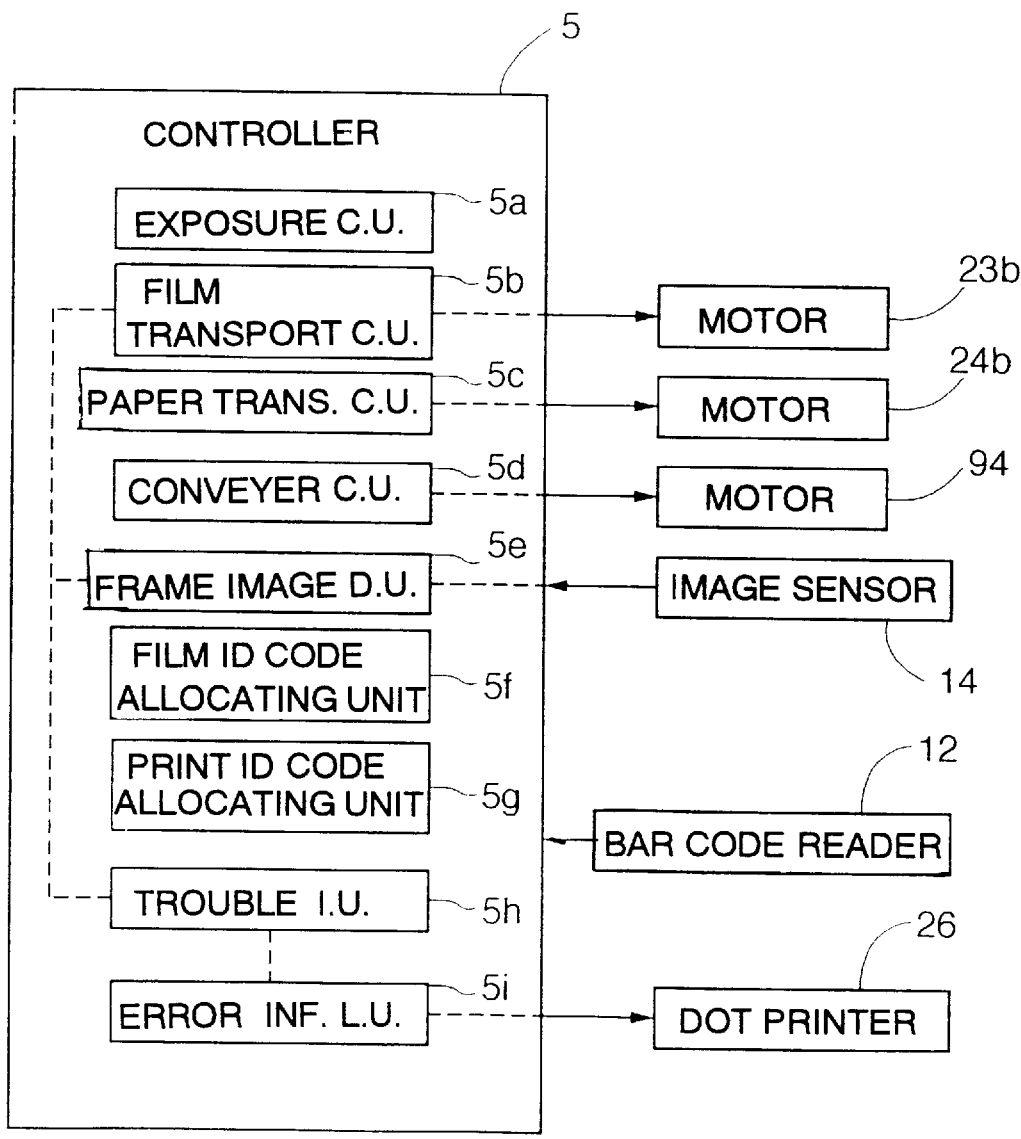
FIG. 4 is a block diagram of a controller.

First, the film reader 21 reads the image of each frame on the negative film 2 transported by the rollers 23a, and transmits image information to a controller 5 which is illustrated in detail in the block diagram of FIG. 4. From the image information received from the film reader 21, an exposure control unit 5a of the controller 5 derives exposing conditions for printing the images of the negative film 2 on the printing paper 3. The exposure control unit 5a controls the light adjustment filter 22b and shutter 22f based on the exposing conditions derived to expose the printing paper 3 when the corresponding frame on the negative film 2 arrives at the position of negative mask 22d. In addition, the controller 5 processes the image information of the negative film 2 read by the film reader 21, and causes a monitor 6a to display simulations of images to be printed on the printing paper 3 with the exposing conditions derived. The operator may observe the simulated images displayed on the monitor 6a, and correct the exposing conditions through a control panel 6b as necessary.

The negative film 2 emerging from the exposing section 20 is cut to a plurality of negative pieces 2 each having six or four frames by a negative cutter 25 in the negative film outlet 60 disposed downstream of the exposing device 22 with respect to the film transport direction. The negative pieces 2 are delivered to the conveyer mechanism 70. Depending on specifications, the negative pieces 2 may be inserted into negative sheets by a negative inserter not shown, the negative sheets being folded before delivery to the conveyer mechanism 70. The negative film 2 designed for an advanced photo system is drawn out of the cartridge before the varied processes, and rewound into the cartridge again after the processes. This type of negative film 2 after the exposing process is delivered to the conveyer mechanism 70 as contained in the cartridge. The negative film 2 is drawn from the negative reel 11 and ultimately transported to the conveyer mechanism 70 under control of a negative film transport control unit 5b of the controller 5.

The developing section 30 includes a plurality of developing tanks not shown. The printing paper 3, with the images of the negative film 2 printed thereon in the exposing section 20, is transported by rollers 24a and a motor 24b for driving the rollers 24a, through a position of a dot printer 26, and successively through the developing tanks in the developing section 30 to be developed. A cutter 27 is disposed upstream of the developing section 30 for cutting the printing paper 3 in an emergency, e.g. when the printing paper 3 cannot be fed from the exposing section 20 to the developing section 30 despite the presence of a loop.

The developed printing paper 3 is dried in the drying section 40 and forwarded to the print outlet 50, where the paper 3 is cut by a paper cutter 51 to become finished prints 3. The prints 3 are delivered by a transverse conveyer 53 to the conveyer mechanism 70. The series of operations for transporting the printing paper 3 or prints 3 cut from the printing paper 3 is controlled by a paper transport control unit 5c of the controller 5.

Figure 5:
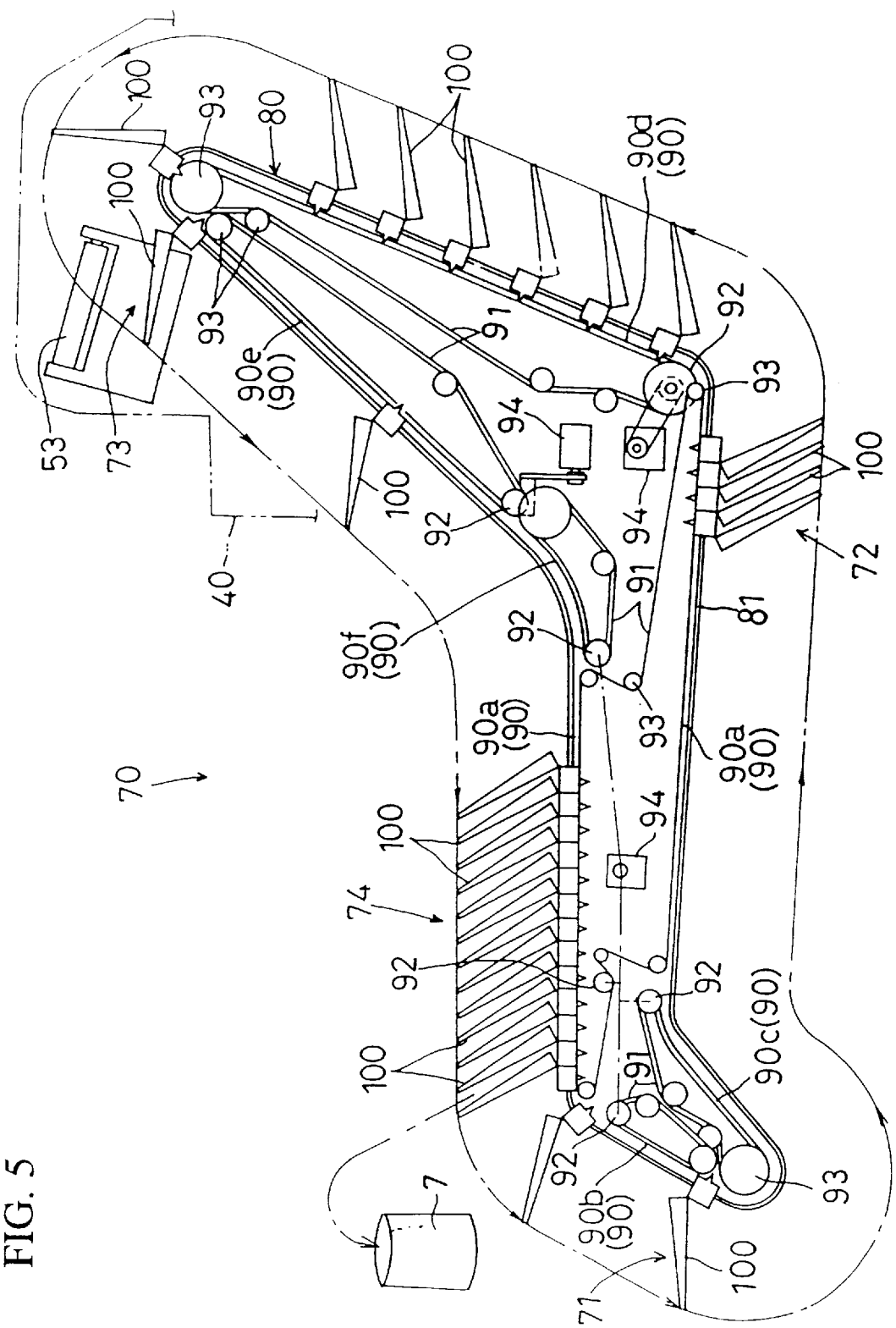
FIG. 5 is a schematic view of a conveyer mechanism forming part of the photograph collating system.
Figure 6:
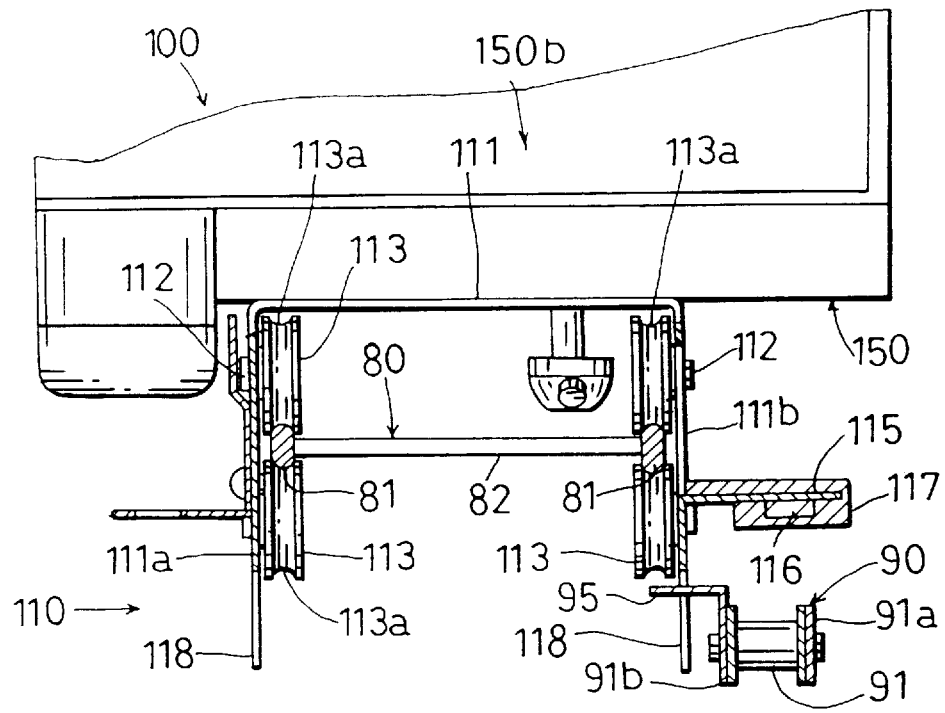
FIG. 6 is an explanatory view showing a relationship between a drive unit and a running device of a tray.
Figure 7:
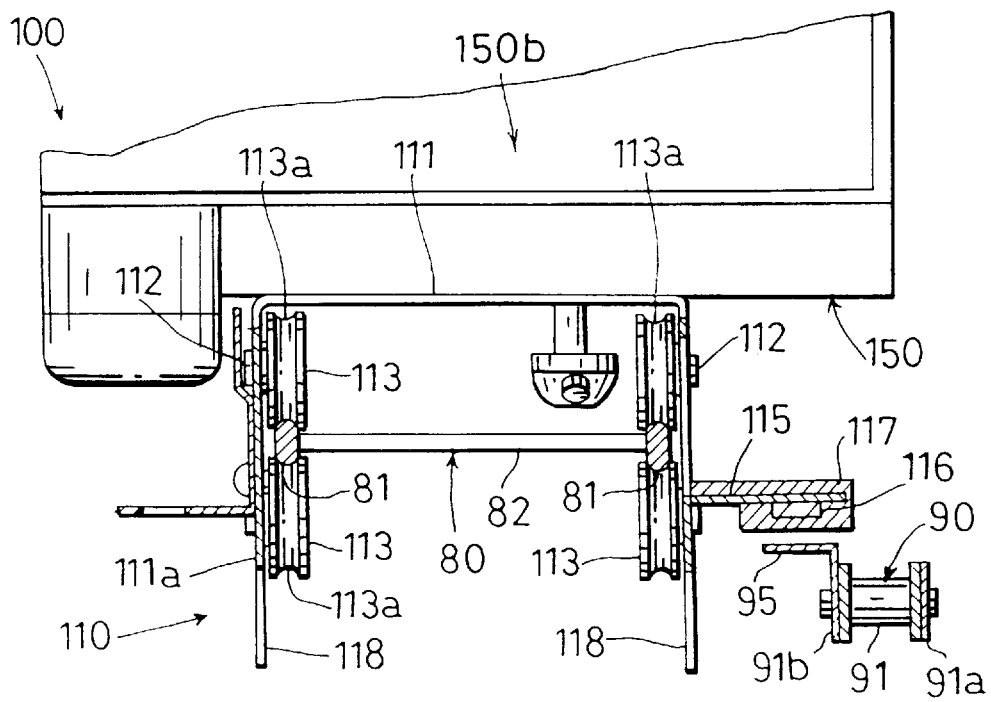
FIG. 7 is an explanatory view showing a relationship between another drive unit and the running device of the tray.
Figure 8:
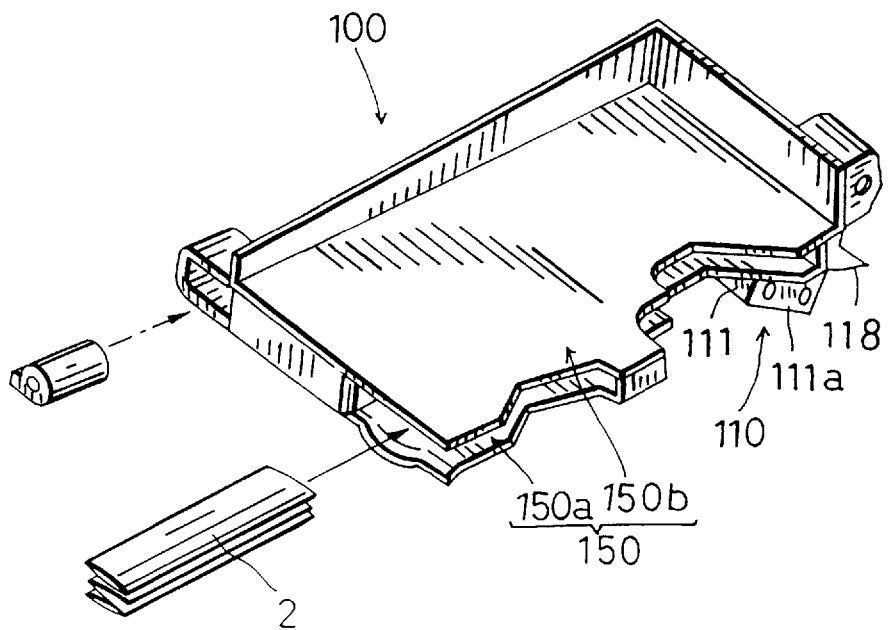
FIG. 8 is an explanatory view showing loading of negative films into a film holder.

As shown in FIG. 5, the conveyer mechanism 70 is the tray conveyer type including a plurality of trays 100 driven by a drive device 90 to move along a guide circuit 80. A transport line provided by the guide circuit 80 includes a negative film intake station 71, a standby station 72, a print intake station 73 and a collating station 74. As shown in FIG. 6, the guide circuit 80 is formed of a pair of right and left rails 81 having an approximately circular section and a connector 82 interconnecting the rails 81 with a predetermined spacing therebetween. The guide circuit 80 extends along side walls of the developing section 30 and drying section 40 and between the negative film outlet 60 disposed in a lower position of the photographic processing apparatus 1 and the print outlet 50 disposed in an upper position thereof As shown in FIGS. 6 through 8, each tray 100 includes a running device 110 for running on the rails 81, and a carrier 150 having a film holder 150a and a print holder 150b. The running device 110 has a channel-shaped running base 111, four running rollers 113 rotatably supported through axles 112 inside each of opposite side ribs 111a and 111b of the running base 111, and an angle bracket for attaching the carrier 150 to the running base 111 at an angle thereto. The eight running rollers 113 of each tray 100 have running surfaces defining grooves 113a shaped to fit on the rails 81. The running device 110 runs steadily on the rails 81, with upper and lower front running rollers 113 and upper and lower rear running rollers 113 on the right rib 111a gripping the right rail 81 in two positions thereof, and upper and lower front running rollers 113 and upper and lower rear running rollers 113 on the left rib 111a gripping the left rail 81 in two positions thereof.

The trays 100 are transported by a drive device 90 of the chain drive type employing chains 91 as endless drive elements. As seen from FIG. 5, the drive device 90 is divided into a first to a sixth drive units 90a–90f. The first drive unit 90a extends between the collating station 74 and standby station 72. The second drive unit 90b is arranged to move emptied trays 100 to a tray stopping position in the negative intake station 72. The third drive unit 90c is arranged to move the trays 100 loaded with the negative films 2 to a storage line at the standby station 72 defined partly by the first drive unit 90a. The fourth drive unit 90d is arranged to move the trays 100 stored in the standby station 72 successively to a tray stopping position in the print intake station 73. As seen from FIG. 5, the fourth drive unit 90d moves the trays 100 up a steep slope. The fifth drive unit 90e moves the trays 100 additionally loaded with prints 3 down a steep slope to a portion of the first drive unit 90a forming the collating station 74. Since the guide circuit 80 is curved upstream of the collating station 74, the sixth drive unit 90f is disposed between the fifth drive unit 90e and the first drive unit 90a to move the trays 100 along the curved line. Each of the above drive units includes a chain 91, a drive sprocket 92 and direction changing sprockets 93 engaging the chain 91, and a drive motor 94 for driving the drive sprocket 92. The first, second, third and sixth drive units 90a, 90b, 90c and 90f receive power from a common drive motor 94. The fourth and fifth drive units 90d and 90e must operate intermittently in a timed way, and therefore receive power from individual drive motors 94, respectively. Each chain 91 includes not only ordinary link plate 91a but pulling link plates 91b defining hitches 95 arranged at predetermined intervals and extending axially of the rollers. Each chain 91 moves the trays 100 by means of these hitches 95.

Two types of engagement are employed for drive transmission between the hitches 95 and the running devices 110 of the trays 100. That is, to form the storage lines, the first drive unit 90a produces an engagement as shown in FIG. 7. A magnet 116 is fixed by a resin 117 to a lower surface of a mounting plate 115 extending perpendicular to and outwardly of the rib 111b of each running device 110. A magnetism acts between the magnet 116 and each hitch 95 of the chain 91 to form an engagement between the running device 110 of each tray 100 and each hitch 95 of the chain 91, whereby the chain 91 moves the tray 100. For this purpose, at least the pulling link plates 91b are formed of a magnetic substance. Thus, when the tray 100 is stopped running by a force greater than the magnetism acting between the tray 100 and chain 91, the engagement between the magnet 116 and hitch 95 is broken whereby only the chain 91 moves forward, leaving the tray 100 standing still. In this way, the trays 100 are successively stored with end surfaces of the running bases 111 contacting each other. After a preceding tray moves forward, the magnet 116 of a next tray 100 magnetically engages a hitch 95 of chain 91 again. Thus, the next tray 100 begins to be moved by the chain 91. That is, the trays 100 are stored and advanced to the position for taking out the negative films 2 and prints 3 automatically and without delay.

The drive units other than the first drive unit 90a have only to move trays 100 and chains 91 together. As shown in FIG. 6, lugs 118 extend downward from lower ends of the ribs 111a and 111b of each running base 110 to contact the hitches 95 of chain 91. As a result, an engagement is produced to transmit drive between the running device 110 and bitches 95.

The drive motors 94 are controlled by a conveyer control unit 5d of the controller 5 in a coordinated way.

At the negative film intake station 71, negative films 2 in one unit discharged from the negative film outlet 60 are transferred to the film holders 150a of trays 100. At the standby station 72, the trays 100 loaded with the negative films 2 can stand by to ensure timing to discharge from the print outlet 50 of prints 3 in the one unit having the images of negative films 2 loaded into the trays 100. At the print intake station 73, the prints 3 in the one unit on which the images of negative films 2 stored in the film holders 150a are printed are transferred from the print outlet 50 to the print holders 150b of trays 100. At the collating station 74, the negative films 2 and prints 3 in the one unit carried by the trays 100 are collated, collected from the trays and put into a product packet. Such collation and collection from each tray 100 are not synchronized with delivery of the trays 100 to the collating station 74. Thus, at the collating station 74, as at the standby station 72, the trays 100 may be stored on the rails 81. Emptied trays 100 are forward to the negative film intake station 71 again.

As seen from FIG. 4, the controller 5 performs various functions besides the functions described hereinbefore. Based on results of detection by an image sensor 14 with respect to the negative films 2 drawn from the negative reel 11, a frame image determining unit 5e determines whether the negative films 2 have a trouble such as back exposure, total fogging, total blanking or half size. A negative film ID code allocating unit 5f allocates a negative film ID code corresponding to a film ID (hereafter referred to as FID) read by the bar-code reader 12 from a bar code seal applied to the negative films 2 in one unit. This negative film ID code is used, in place of the FID, in the processes in the photographic processing apparatus 1 to identify the negative films 2 in one unit. An ID code for a product packet 7 is linked to each FID. By collating these ID codes, the negative films 2 with a particular FID are put in into a predetermined product packet 7. To assure that the prints 3 produced from these negative films 2 be put into the predetermined product packet 7, a print ID code allocating unit 5g is provided to allocate a print ID code to the area of printing paper 3 printed with frame images of the negative films 2 in the exposing section 20. This print ID code also is linked to the negative film ID code. The print ID code is formed as a 6-bit code on the printing paper directly and mechanically by a notcher not shown. A trouble identifying unit 5h identifies a processing trouble detected by the frame image determining unit 5e, or a transport jamming detected by the negative film transport control unit 5b, and transmits the nature of the trouble to an error information link unit 5i. Based on the nature of the trouble received, the error information link unit 5i selects error information, and links this error information to the negative film ID code and print ID code of the negative films 2 responsible for the trouble.

Figure 9:
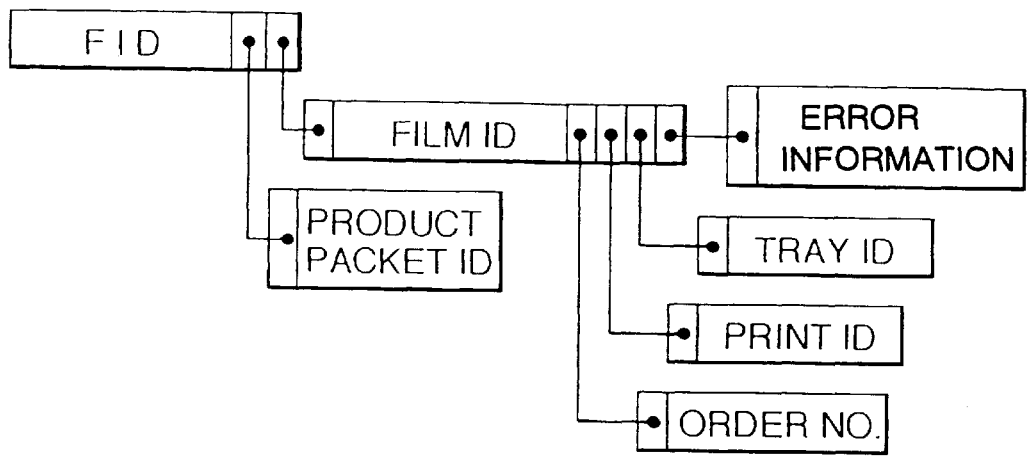
FIG. 9 is a schematic view illustrating a structure for linking varied ID codes.

To facilitate understanding of a link structure of the above various ID codes and error information, the link structure is schematically shown in FIG. 9. As seen, the negative film ID code has also an orders number linked thereto. The negative films 2 and prints 3 with a linked negative film ID code and print ID code are loaded into one tray 100 to be combined and collated automatically. For this purpose, the tray ID code is linked to the negative film ID code, and hence to the print ID code.

In the course of printing the images of negative film 2 on the printing paper 3, a processing trouble may occur which would make a subsequent normal processing impossible. In such a case, the controller 5 is operable as described hereinafter.

Figure 10:
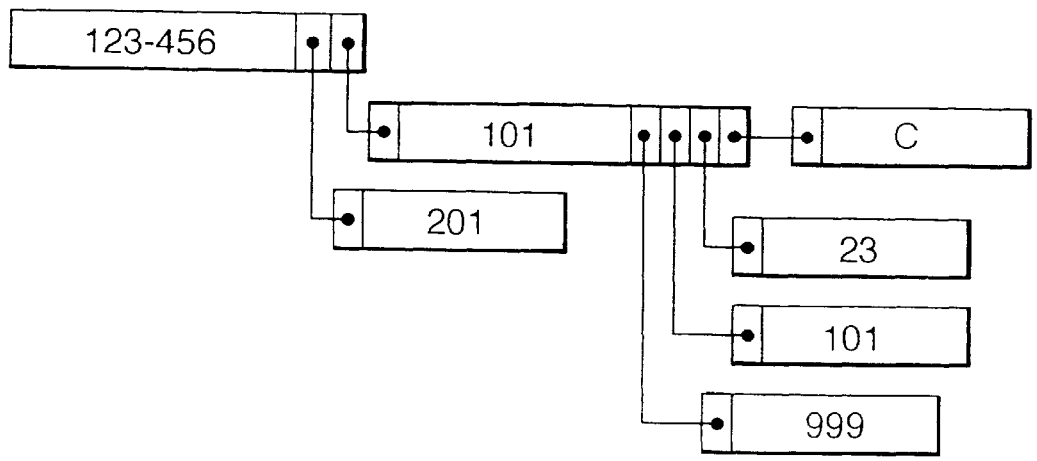
FIG. 10 is a schematic view of one example of structures for linking varied ID codes.

Assume, for example, the trouble identifying unit 5h confirms through the image determining unit 5e that negative film 2 with FID: 123–456 has a trouble of total blanking. Then, the printing paper 3 is fed by 82.5 mm without exposing the frame images of this negative film 2. As a result, an unexposed region is formed on the printing paper 3. The print ID code allocating unit 5g allocates a print ID code: 101 to this unexposed region as well, and links it to the negative film ID: 101 of the negative film 2. This print ID code: 101 is obtained by incrementing a previous print ID code by one. Further, this negative film ID code: 101 has order No: 999 linked thereto. At the same time, the error information link unit 5i links error information: C for a total blanking trouble to the negative film ID: 101. The link structure of this example is shown in FIG. 10.

Figure 11:
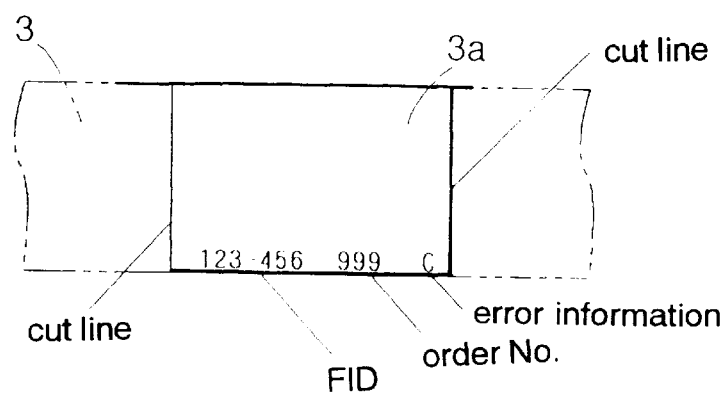
FIG. 11 is an explanatory view of printed error information.

When the above unexposed region on the printing paper 3 enters a printing position of dot printer 26, the dot printer 26 prints, as shown in FIG. 11, FID: 123–456, order No: 999 and error information: C in the horizontal direction on the back of the unexposed region. This unexposed region is ultimately cut by the paper cutter 51, discharged from the print outlet 50 as a print 3a with error information, and loaded into the tray 100 with tray ID: 23 linked thereto. The print 3a with this error information has a white image of unexposed print on the image forming surface thereof. Thus, the print 3a is clearly distinguishable from the other prints 3. When the negative film 2 having the trouble is discharged from the negative film outlet 60, this negative film 2 is loaded into the same tray 100. When the negative film 2 having the trouble is forcibly removed from a halfway position, the operator combines it with the print 3a with the error information at the collating station 74 Thus, even in the event of the above process disrupting trouble, a print ID code linked to the negative film ID and the like is allocated to the print 3a with error information, and the print 3a is loaded into a predetermined tray 100, thereby facilitating a collating operation.

The alphabet is used to express error information resulting from troubles due to human factors, such as A for back exposure, B for half size and D for total fogging. Four-digit numbers are used for troubles due to mechanical factors, such as transport jamming.

Modified Embodiment

Operations of the controller 5 different from the above operation taking place when a processing trouble occurs in the course of printing the images of negative film 2 on the printing paper 3, which would make a subsequent normal processing impossible, will be described hereinafter.

Here, two different measures are taken, depending on a processing situation of negative film 2 at a point of time when a process disrupting trouble occurs.

Firstly, a case where a negative film 2 having the trouble is not subjected to an exposing process yet:

1) The negative film 2 having the trouble is caused to stand by until the exposing process for a preceding negative film 2 is completed.
2) The printing paper 3 is fed by 82.5 mm without being exposed.
3) A print ID code is newly allocated to the unexposed region formed on the printing paper 3 fed without being exposed.
4) Start an exposing process for the following negative film 2.
5) An unexposed print 3a acting as an error indicating print produced by cutting the above unexposed region having reached the paper cutter 51 is forwarded to the print intake station 73.
6) The unexposed print 3a is loaded onto the print holder 150b of a tray 100 having a corresponding tray ID code.
7) The trays 100 move for loading of prints 3 having a next print ID code.

In this case, only one unexposed print 3a is placed on the print holder 150b of the tray 100. The operator can easily recognize this trouble-laden tray 100 since the print 3a has a white surface.

Secondly, a case where a negative film 2 having the trouble is undergoing an exposing process:

1) The negative film 2 having the trouble is caused to stand by until the exposing process for a preceding negative film 2 is completed.
1) The printing paper 3 is fed by 82.5 mm without being exposed.
2) The same print ID code as the immediately preceding ID code is allocated to the unexposed region formed on the printing paper 3 fed without being exposed.
3) Start an exposing process for the following negative film 2.
4) An unexposed print 3a acting as an error indicating print produced by cutting the above unexposed region having reached the paper cutter 51 is forwarded to the print intake station 73.
5) The unexposed print 3a is loaded, along with the prints having the same print ID code, onto the print holder 150b of a tray 100 having a corresponding tray ID code.
6) The trays 100 move for loading of prints 3 having a next print ID code.

In this case, the unexposed print 3a is placed on top of the prints on the print holder 150b of the tray 100. The operator can easily recognize this trouble-laden tray 100 since the print 3a has a white surface.

In either case, when negative film 2 having the trouble is discharged from the negative film outlet 60, this negative film 2 is loaded onto the film holder 150b of the same tray 100. When the negative film 2 having the trouble is forcibly removed from a halfway position, the operator identifies the negative film 2 removed forcibly, by referring to ID codes such as an FID allocated to finished products (negative films 2 and prints 3) in a preceding and a succeeding trays 100.

The trouble identifying unit 5h and error information link unit 5i of controller 5 have a function to print the nature of the trouble on the back of the unexposed print 3a when the above process disrupting trouble occurs. That is, when the frame image determining unit 5e detects the process disrupting trouble, or when the negative film transport control unit 5b detects a transport jamming, this trouble is identified and the nature of the trouble identified is passed on to the error information link unit 5i. The error information link unit 5i selects error information based on the nature of the trouble received, and links this error information to the negative film ID code of the negative film 2 having caused the trouble. When the above unexposed region on the printing paper 3 enters the printing position of dot printer 26, the dot printer 26 prints an FID, an order number and the error information in the horizontal direction on the back of the unexposed region as shown in FIG. 11. The alphabet is used to express error information resulting from troubles due to human factors, such as A for back exposure, B for half size and D for total fogging. Four-digit numbers are used for troubles due to mechanical factors, such as transport jamming.

In the modified embodiment, an unexposed image is used as the error indicating image on the error indicating print 3. It is also possible to use, as the error indicating image, an image different from images derived from ordinary negative films 2. For example, an error indicating image mask may be prepared to form a particular mark image for use as the error indicating image.

What is claimed is:

1. A photographic processing apparatus having an exposing section for printing images of negative films on printing paper, a negative film outlet for discharging the negative films used in the exposing section, a developing section for developing the printing paper printed, and a print outlet for cutting the printing paper developed to predetermined lengths, and discharging the cut printing paper as prints, the negative films being discharged unit by unit from the negative film outlet and the prints having the images of the negative films in corresponding units being discharged unit by unit from the print outlet, the negative films and prints being combined and collated as finished products, said apparatus comprising:

trouble identifying means for identifying a process disrupting trouble occurring during a process of printing images of a negative film on the printing paper;

error information link means for linking error information on said process disrupting trouble identified by said trouble identifying means to an ID code of said negative film having caused said process disrupting trouble; and printing means for writing said error information in a region of said printing paper for printing an image of said negative film responsible for said process disrupting trouble.

2. A photographic processing apparatus as defined in claim 1, wherein an unexposed region is formed in said region of said printing paper for printing an image of said negative film responsible for said process disrupting trouble, said error information being written on a back of said unexposed region.

3. A photographic processing apparatus as defined in claim 1, wherein said error information is written in forms distinguishing between a trouble due to a mechanical factor and a trouble due to a human factor.

4. A photographic processing apparatus as defined in claim 1, wherein a print ID code linked to said ID code of said negative film is applied to the prints having images obtained from said negative film in one unit, and a print ID code linked to an ID code of said negative film having caused said process disrupting trouble is applied to said print having said error information written thereon.

5. A photographic processing apparatus as defined in claim 1, wherein said error information is printed on said printing paper by a dot printer disposed on a printing paper transport path extending from said exposing section to said developing section.

6. A photographic processing apparatus having an exposing section for printing images of negative films on printing paper, a negative film outlet for discharging the negative films used in the exposing section, a developing section for developing the printing paper printed, and a print outlet for cutting the printing paper developed to predetermined lengths, and discharging the cut printing paper as prints, the negative films being discharged unit by unit from the negative film outlet and the prints having the images of the negative films in corresponding units being discharged unit by unit from the print outlet, the negative films and prints being combined and collated as finished products, said apparatus comprising:

trouble identifying means for identifying a process disrupting trouble occurring during a process of printing images of a negative film on the printing paper;

wherein an error indicating image showing occurrence of said process disrupting trouble is formed in a region of said printing paper for printing an image of said negative film responsible for said process disrupting trouble, said error indicating image on said printing paper being cut to a predetermined length and discharged from said print outlet as an error indicating print.

7. A photographic processing apparatus as defined in claim 6, wherein said error indicating image is an unexposed image, said error indicating print being discharged from said print outlet as an unexposed print.

8. A photographic processing apparatus as defined in claim 6 or 7, further comprising a tray conveyer mechanism including a plurality of trays each having a film holder for receiving the negative films in one unit discharged from said negative film outlet, and a print holder for receiving the prints discharged from said print outlet, said prints having images derived from said negative films being loaded into said film holder, wherein said error indicating print is placed on said print holder of the tray loaded with said negative film having caused said process disrupting trouble.

9. A photographic processing apparatus as defined in claim 8, wherein, when said process disrupting trouble occurs before starting an exposing process for said negative films in one unit, an exposing process is carried out for next negative films in one unit after only said error indicating image is formed on said printing paper, whereby only said error indicating print is placed on said print holder of the tray loaded with said negative film having caused said process disrupting trouble.

10. A photographic processing apparatus as defined in claim 8, wherein, when said process disrupting trouble occurs during an exposing process for said negative films in one unit, an exposing process is carried out for next negative films in one unit after only said error indicating image is formed on said printing paper, whereby said error indicating print is placed on top of prints on said print holder of the tray loaded with said negative film having caused said process disrupting trouble.

\* \* \* \* \*